Patented Mar. 25, 1941

2,235,827

UNITED STATES PATENT OFFICE 2,235,827

PROCESS OF PRODUCING A SIRUP EXTRACT FROM YEAST, HIGH IN B VITAMINS

Nathan Minton Cregor, New York, N. Y., Frederick E. Timmer, Hasbrouck Heights, N. J., and Robert M. Allen, New York, N. Y., assignors to Vegex, Incorporated, New York, N. Y., a corporation of Delaware No Drawing. Application March 23, 1935, Serial No. 12,674. Renewed April 22, 1939

17 Claims.  (Cl. 99—97)

This invention relates to a sirup from yeast, high in all of the B vitamins, including what is now known as vitamin $B_1$ and vitamin $B_2(G)$.

It is known that yeast and sugar, mixed and heated to kill the fermentation and with enough sugar for preservation makes a palatable sirup. Such a product because of the low content in yeast solids is similarly low in vitamin B potency; depending on the temperature and the length of time in heating especially low in $B_1$.

We have discovered that dried yeast, dried so as to preserve the potency in the B vitamins, can be broken down with sugar and enzymes so as to give an extract comparable in potency to the dried yeast.

Dried yeast and dried brewer's yeast retains, however the method of drying, a flavor not palatable to many people. Further the dried yeast is not all broken up in the digestive processes and much passes through without giving up the iron and B vitamin for which such product is consumed and used as a diet and in medicine.

Acid, alcohol and other extractions have been made. A high potency in vitamin $B_1$ may be secured at the expense of the other factors in the vitamin B complex and without which vitamin $B_1$ is of little or no value. The thing desired is an extract highly potent in all of the known B vitamins, universally palatable, easily borne by babies and invalids and sufficiently economical to admit of daily use to make up the deficiency in the B vitamins which exists in the daily diets of most people, young or old.

We have accomplished and reveal examples of how it is done as follows:

| | | |
|---|---|---|
| Water | pounds | 300 |
| Fresh compressed yeast | do | 10 |
| Dried brewer's yeast | do | 100 |
| Cane sugar | do | 100 |
| Papain | grams | 10 |

Break the fresh, compressed yeast into the water at a temperature of twenty degrees centigrade and add in the dried brewer's yeast. Stir and allow to stand for at least twenty minutes. Add the sugar and stir until dissolved. Add the ten grams of papain.

Heat to forty degrees centigrade and hold at this temperature for ten to fifteen minutes, then raise to sixty degrees centigrade and hold for fifteen minutes. Then with sufficient water for centrifuging or filtering, heat to temperature of one hundred degrees centigrade.

Centrifuge or filter and evaporate in vacuo to a consistency of eighty per cent solids.

We have found that a satisfactory yield can be obtained by omitting the papain and increasing the fresh compressed yeast to from fifteen to twenty-five pounds or more. We have found that a fresh yeast, partially separated from the wort but not compressed with the relative amount of yeast solids calculated on the amount in the compressed yeast, gives good results. So, too, we have found that growing a yeast culture in a wort and using that wort, before the yeast is separated or settled in lieu of the water in the mixture, acts satisfactorily with the sugar in the digesting and plasmolyzing of the dried yeast cell.

Enzymes from the aspergillus oryzae fungus can be used instead of the papain. In fact, any product high in proteolytic enzymes can be used.

We do not confine ourselves to the temperatures so long as they are kept within the range within which a maximum of yield is obtained from the broken-down dried yeast and from the compressed yeast, and so long as the temperature used in the condensing is not such as to hurt, particularly, the vitamin $B_1$ potency in the resultant product.

We do not confine ourselves to cane sugar, but can use malt sirup or malt sugar, corn sirup or corn sugar and honey.

What we claim is:

1. The method of producing a sirup from yeast, high in the B vitamins, including $B_1$ and $B_2(G)$, which consists in subjecting dried yeast to the action of the enzymes of fresh yeast in the presence of sugar under conditions such that the fermentation of the sugar is insignificant.

2. The method of producing a sirup from fresh and dried yeast, high in the B vitamins, including $B_1$ and $B_2(G)$, which consists in subjecting dried yeast to the action of the enzymes of fresh yeast together with added proteolytic enzymes in the presence of sugar.

3. The method of producing a sirup from fresh and dried yeast high in the B vitamins, including $B_1$ and $B_2(G)$, which consists in subjecting dried yeast to the action of sugar, fresh yeast and added proteolytic enzymes.

4. The method of producing a sirup from fresh and dried yeast high in the B vitamins, including $B_1$ and $B_2(G)$, which consists in subjecting dried yeast to the simultaneous action of compressed yeast and of a ferment high in proteolytic enzymes.

5. The method of producing a sirup of yeast high in the B vitamins, including $B_1$ and $B_2(G)$, which consists of combining fresh yeast and dried yeast with a water solution of sugar, heating the mixture to promote the extraction of the water-soluble elements from the yeast, separating and condensing the water soluble extract.

6. The method of producing a sirup from yeast high in the B vitamins, including $B_1$ and $B_2(G)$, which consists of combining dried brewer's yeast and fresh yeast with proteolytic enzymes in a water solution of sugar, digesting and plasmolyzing the resulting water soluble extract from the yeast cell and condensing in vacuo.

7. The method of producing a sirup of yeast high in the B vitamins, including $B_1$ and $B_2(G)$, which comprises mixing 300 pounds of water, 10 pounds of fresh compressed yeast, 100 pounds of dried brewer's yeast, 100 pounds of sugar and 10 grams of papain, thoroughly mixing, heating to a temperature of forty degrees centigrade for from ten to fifteen minutes, then raising to a temperature of sixty degrees centigrade for fifteen minutes, adding sufficient water for suitable filtering or centrifuging, heating to a temperature of one hundred degrees centigrade, then filtering or centrifuging the water soluble liquid and condensing in vacuo to a consistency of approximately eighty per cent solids.

8. The method of producing a sirup high in the B vitamins including $B_1$ and $B_2(G)$, which consists in digesting dried yeast in a sugar syrup with proteolytic enzymes, removing the insoluble matter and condensing the solution to the desired consistency.

9. The method of producing a sirup high in the B vitamins including $B_1$ and $B_2(G)$, which consists in digesting dried yeast in a sugar sirup with fresh yeast, removing the insoluble matter and condensing the solution to the desired consistency.

10. The method of producing a sirup high in the B vitamins including $B_1$ and $B_2(G)$, which consists in digesting dried yeast in a sugar sirup with fresh yeast and additional proteolytic enzymes, removing the insoluble matter and condensing the solution to the desired consistency.

11. The method of producing a sirup high in the B vitamins including $B_1$ and $B_2(G)$, which consists in digesting dried yeast in a sugar sirup with papain, removing the insoluble matter and condensing the solution to the desired consistency.

12. The method of producing a sirup high in the B vitamins including $B_1$ and $B_2(G)$, which consists in digesting dried yeast in a sugar sirup with fresh yeast and papain, removing the insoluble matter and condensing the solution to the desired consistency.

13. The method of producing a sirup rich in vitamin B, including $B_1$ and $B_2(G)$, which consists in mixing fresh yeast, dried yeast and sugar in water, progressively and slowly heating from 20° C. to 100° C. and then concentrating to a consistency of substantially 80% solids by evaporation in vacuo.

14. The method of producing a sirup rich in vitamin B, including $B_1$ and $B_2(G)$, which consists in mixing fresh yeast, dried yeast and sugar, and a substance containing proteolytic enzymes in water, progressively and slowly heating from 20° C. to 100° C. and then concentrating to a consistency of substantially 80% solids by evaporation in vacuo.

15. The step in a process for producing from dried yeast a sirup high in B vitamins, including $B_1$ and $B_2(G)$ which consists in subjecting dried yeast to the action of proteolytic enzymes in the presence of sugar.

16. The step in a process for producing from yeast a sirup high in B vitamins including $B_1$ and $B_2(G)$, which consists in digesting dried yeast with active enzymes in the presence of sugar under conditions favorable to such action without significant fermentation of the sugar.

17. The step in a process for producing from dried yeast a sirup high in B vitamins including $B_1$ and $B_2(G)$ which consists in adding to dried yeast a substance high in proteolytic enzymes and maintaining conditions favorable to the action of said enzymes on the yeast, and thereafter altering said conditions to conditions unfavorable to the growth of the substance containing said enzymes before significant growth has taken place.

N. MINTON CREGOR.
FREDERICK E. TIMMER.
ROBT. M. ALLEN.